Jan. 15, 1963 H. G. JOHNSON 3,073,336
LINED BALL VALVE
Filed Jan. 10, 1962 2 Sheets-Sheet 1
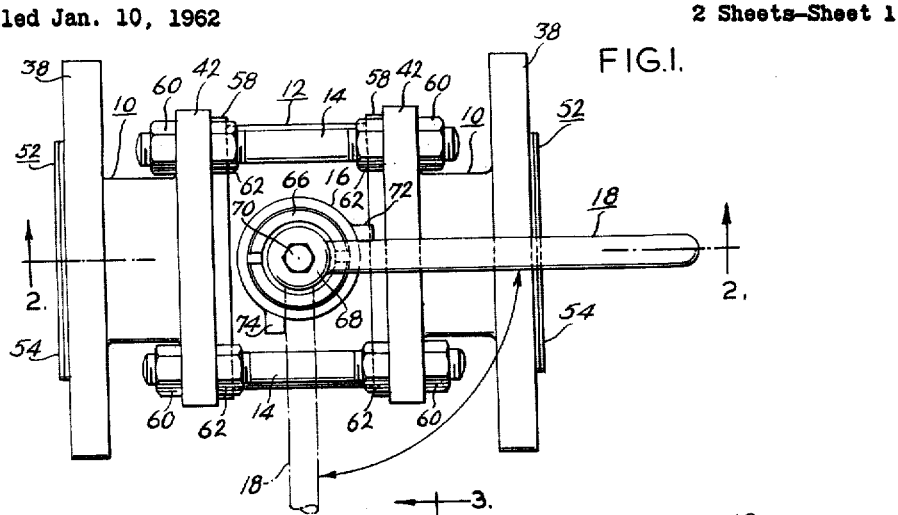
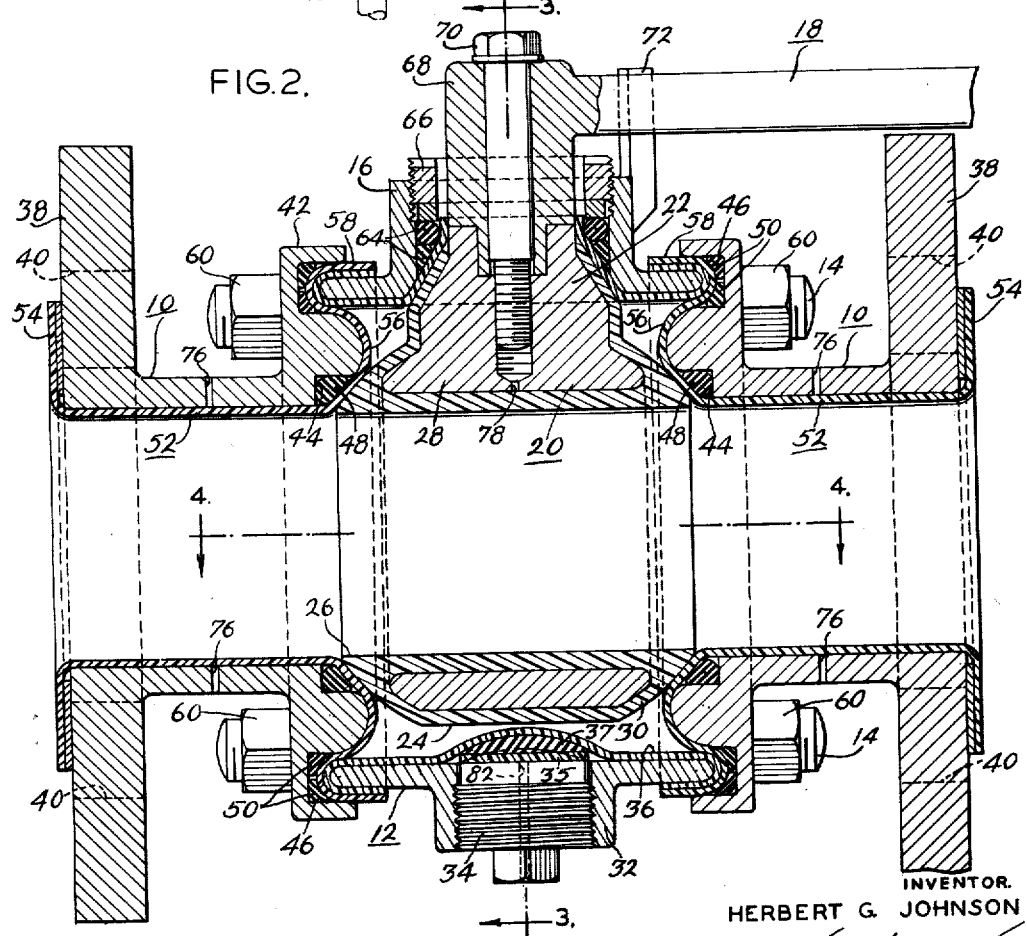
INVENTOR.
HERBERT G. JOHNSON
BY Howson & Howson
ATTYS.

Jan. 15, 1963 — H. G. JOHNSON — 3,073,336
LINED BALL VALVE
Filed Jan. 10, 1962 — 2 Sheets-Sheet 2

INVENTOR.
HERBERT G. JOHNSON
BY Howson & Howson
ATTYS.

United States Patent Office 3,073,336
Patented Jan. 15, 1963

3,073,336
LINED BALL VALVE
Herbert G. Johnson, Havertown, Pa., assignor to Raybestos-Manhattan, Inc., Manheim, Pa., a corporation of New Jersey
Filed Jan. 10, 1962, Ser. No. 165,331
15 Claims. (Cl. 137—375)

The present invention relates generally to fluid valves and more particularly to a ball type valve having a strong external pressure-carrying structure and separate internal fluid contacting surfaces such that the external structure is not subjected to fluid contact.

The development and wide-spread use of plastic-lined pipe especially in the chemical industry in handling corrosive fluids has created a need for a high pressure, tight-closing, leakproof and high capacity valve lined with a corrosion-resistant material to provide a complete fluid delivery system which is free from the usual corrosion and maintenance problems.

Accordingly, it is a first object of the present invention to provide a valve having all fluid-contacting surfaces consisting of a suitable corrosion-resistant material such as synthetic organic plastic.

An additional object of the invention is to provide a valve, all sliding and sealing surfaces of which are of a synthetic organic plastic material and are self lubricating, such that corrosion and sticking is prevented.

A further object of the invention is to provide a valve as described, the sealing surfaces of which are provided with underlying resilient seal rings supporting the plastic lining so that the plastic sealing surfaces are not only resilient to obtain a high degree of sealing, but also flex fatigue resistant. In addition the sealing surfaces, because of their flexibility compensate for dimensional changes with changes in temperature. Furthermore, they may be subjected to varying sealing pressures by means of exteriorly located adjusting means to maintain tight seating of the ball, yet relatively easy operation of its valve.

Another object of the invention is to provide a valve of the type described permitting fluid flow in either direction and which is suitable for vacuum or pressure service.

A still further object is to provide such a valve which does not cause turbulence or appreciable pressure drop of the fluid passing therethrough.

Another object is to provide a full-bore, straight-through unobstructed opening through the valve when open.

A further object is to provide a valve having a thick, corrosion-resistant, fluid-impervious plastic lining which does not require bonding to the pressure-carrying structure of the valve and which when worn may readily be replaced.

An additional object is to provide a valve having a lining which is mechanically supported in such a manner that repeated thermal and pressure cycles with opposing stresses cannot stretch, crack or shrink the lining from the pressure-carrying structure of the valve.

A still further object is to provide a lined valve as described including a system for venting the area between the plastic lining and the pressure-carrying structure so that fluid seepage between the lining or ball cover, and the supporting structure will be vented to the atmosphere and will not build up pressure which might collapse the lining.

Still another object of the invention is to provide a valve as described which is simple, light, compact, economical, easily assembled and disassembled, and which may be easily serviced without special tools.

Additional objects and advantages of the invention will be more readily apparent from the following detailed description of an embodiment thereof when taken together with the accompanying drawings in which:

FIG. 1 is a plan view of an embodiment of the invention showing the open and closed operating handle positions;

FIG. 2 is a sectional view taken along line 2—2 of FIG. 1 showing the interior arrangement of the valve elements with the valve in the open position;

Figure 3:
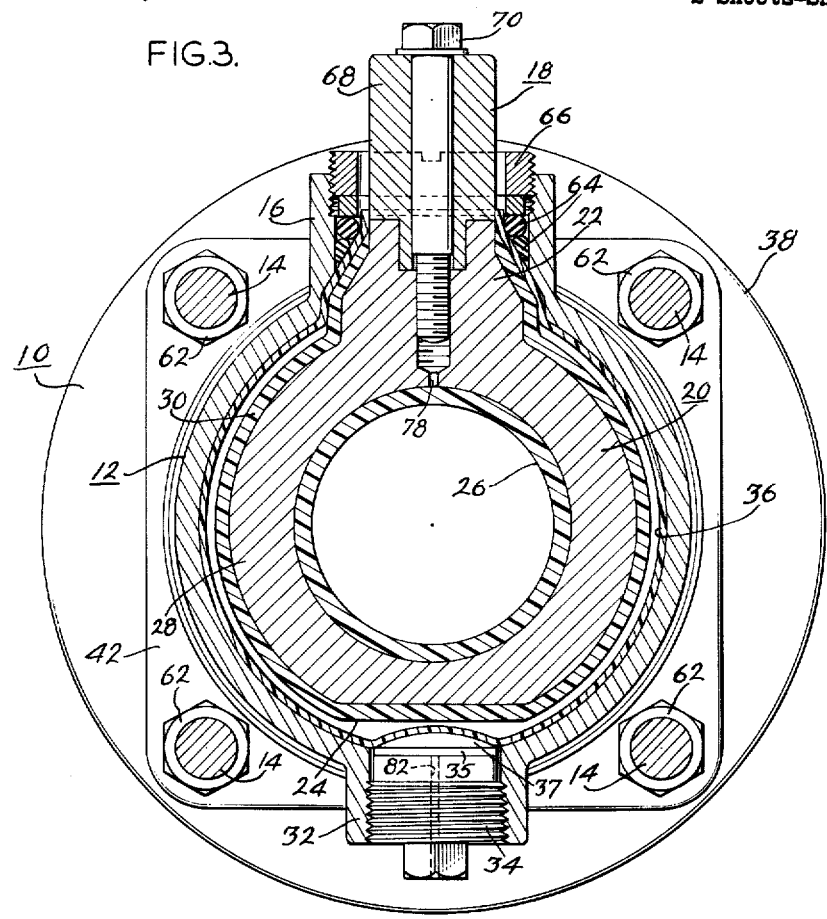
FIG. 3 is a sectional view of the valve taken along line 3—3 of FIG. 2.

Referring to the drawings, FIG. 1 shows a ball valve in accordance with the invention characterized by flanged end casing members 10 between which the body spool 12 is secured by tie bars 14. The valve mechanism is actuated through a gland 16 on the body spool 12 by the handle 18.

The interior arrangement of the valve is shown in FIG. 2 including the strurcture and disposition of the valve ball 20 within the spool and casing elements. The ball, although generally spherical in shape as can be seen more clearly in FIGS. 3 and 4, includes an integral stem portion 22 opposed from a flat base portion 24, and is centrally bored to provide a fluid passage 26.

In the embodiment shown in the drawings the ball consists of a metal shell 28 covered except for the external end of the stem portion 22 by a layer 30 of a plastic material, which preferably is almost completely inert to chemicals and has excellent self-lubricating properties as for example, polytetrafluoroethylene sold under the trade mark Teflon.

The valve ball is encircled by the body spool 12, the stem portion 22 of the ball extending into the gland 16 of the spool as shown in FIGS. 2 and 3. Diametrically opposed from the gland 16 on the spool 12 is a threaded boss 32 adapted to receive the bottom guide plug 34 which is capped by plastic disc 35 and resilient disc 37. A plastic liner 36 is applied over the inner surface of the spool and gland and is lapped back approximately 180° over the annular edges of the spool to secure it thereto.

The two cylindrical end casings 10 include outer connecting flanges 38 for attachment of the valve to other similarly flanged members, for which purpose bolt holes 40 are provided. The inner end of each casing terminates in a body flange 42 having an annular ball seal seat 44 and an annular body spool seal slot 46 therein.

Annular resilient ball seal rings 48 and annular body spool seal rings 50 are positioned within the ball seal seats 44 and the body spool seal slots 46 respectively.

Figure 4:
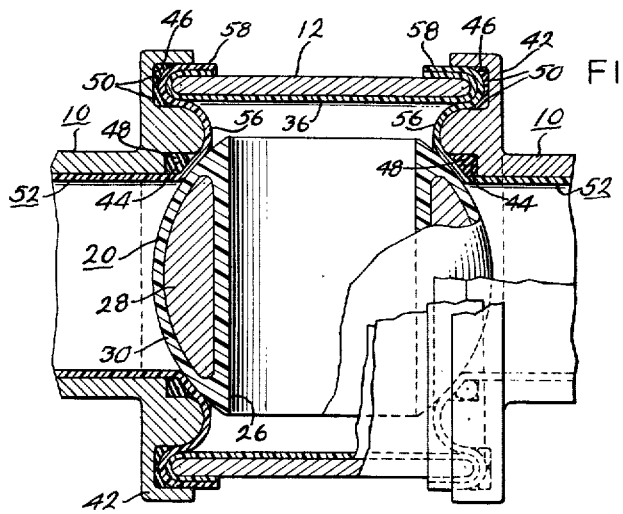
FIG. 4 is a sectional view of the valve taken along line 4—4 of FIG. 2 showing the valve in the closed position.

Plastic end casing liners 52 are fitted within the end casings 10 and are flanged on both ends in the manner shown in FIGS. 2 and 4, an external flange 54 providing a sealing surface for joining the valve to adjacent flanged members, and an internal flange extending over the seal rings 48 and 50 terminating in a lip portion 58 overlapping the lapped back portion of the liner 36.

The body flanges 42 of the end casings 10 are bored to accommodate the tie bars, 14. Retaining nuts 60 on the tie bars secure the end casings 10 in the desired sealing relation with the body spool 12. Lock nuts 62 bearing against the inner surfaces of the body flanges 42 maintain the retaining nuts in the desired position.

A resilient composite gland seal ring 64 is positioned between the gland 16 and the liner 36. The threaded gland ring 66 is screwed into the gland to engage and compress the seal ring 64, thus effecting a fluid tight seal between the liner 36 and the coated sides of ball stem portion 22.

The stem extension 68 is secured to the ball stem portion 22 by the stem bolt 70 and includes the handle 18 for actuating the valve ball. Limit stops 72 and 74 secured to the gland 16 stop the handle 18 in the full open or full closed position.

Vent holes 76 in end casing 10 provide venting of the area between the end casing and the liners 52. For the same purpose, vent holes 78 and 82 are respectively provided in the shell 28 and bottom guide plug 34.

For operation, the valve is inserted in a fluid carrying line by means of the connecting flanges 38. With the valve in the open position shown in FIG. 2, the flow of fluid is unimpeded by the valve, there being no pressure drop across the valve due to construction since the bore of the valve ball is equal to that of the end casings and presumably the connected fluid lines. By turning the handle 90° as indicated in FIG. 1 the valve is turned to the full closed position shown in FIG. 4. In this position the fluid passage is blocked by the valve ball which is sealed on both sides by the lining over the annular resilient seal rings to provide a double safeguard against leakage.

Fluid pressures within the valve do not exert a torque on the valve ball either in the open or closed position. Hence the sealing force resiliently applied around the seal rings 48 by adjustment of the tie bars 14 need only be of a degree sufficient to prevent leakage of the fluids through these ball seat seals. This sealing tension will normally depend upon the fluid pressures in the system.

Tightening of the gland ring 66 to produce a sealing compression of the seal ring 64 will also exert a downward force on the ball stem portion 22, which force would be absorbed by the lower portions of the seal rings 48. This would create an uneven sealing relationship between the ball and resilient seat by creating a greater sealing pressure around the lower portions of the seal. In order to prevent this condition, the bottom guide plug 34 capped with resilient disc 37 is provided to bear against the flat base portion 24 of the valve ball 20 to receive the downward force generated by the tightening of the gland ring 66. By backing the lining at this point with the guide plug and resilient disc, an elastic, adjustable upward force is provided against the ball to assist in sealing the stem. If the thickness of the liner in the stem section is reduced by plastic flow, this resilient disc automatically compensates for the decreased thickness and maintains a fluid tight seal. Likewise if there is thermal expansion of either the liner or the ball due to changes in temperature, a fluid-tight seal is nevertheless assured by the continued pressure of the resilient disc. A spring washer or coil spring type of adjustment can be used as an alternate for the resilient disc. The guide plug 34 should not require further adjustment after its correct position has been initially determined.

Although the thickness of the plastic liners is a matter of choice, for a two inch size valve it has been found that 1/16 inch lines are well adapted to provide the resilient sealing action in conjunction with the various seal rings which is one of the important features of the invention.

The use of resilient support under the sealng portons of the plastic liner is essential to compensate for its tendency to cold flow under pressure and take a permanent set. Without some such spring action behind it, the initial seal would soon be lost—or if enough adjusting pressure applied to make a permanent seal, the ball would be likely to stick tightly to the seat and resist turning.

The end casing liners 52 and the spool and gland liner 36 may be readily shaped by the method which is the subject of the copending application S.N. 130,149, filed August 8, 1961, which is directed particularly to the shaping of Teflon tubing. Using this method, the end casing liners 52 may both be formed from a singular tubular pre-form which is bulged under compressive force to form an arched shape and then cut across its axis to form the two end linings without waste of material or significant thinning of the lining wall.

The suggested use of Teflon for the plastic liners is particularly desirable in view of its self-lubricating property which would render the valves from the necessity of external lubrication inasmuch as all of the sliding surfaces would be of Teflon. Additionally, its chemical inertness permits use of a Teflon-lined valve with nearly all types of corrosive fluids.

Although only a manually operated valve is shown, the invention is readily adaptable to automatic actuation by methods well known in the art.

The present device by providing a series of overlapping and sliding resiliently supported seals of plastic material prevents fluid contact with the metallic valve elements. The simple, light-weight construction provides a compact, high-performance, leak-proof valve requiring a minimum amount of adjustment and maintenance.

As stated above, a preferred material forming the lining of the valve of this invention is polytetrafluoroethylene. However, other fluorocarbon polymers may be used as the liner, as for example, copolymers of tetrafluoroethylene with other unsaturated organic compounds, such as ethylene and chlorotrifluoroethylene. Other suitable fluorocarbon polymers include polychlorotrifluoroethylene, sold under the trademark Kel–F, and various copolymers of chlorotrifluoroethylene. In addition to fluorocarbon polymers, the lining may be formed of such synthetic organic plastics as polyethylene, polypropylene, vinyl polymers such as polyvinyl chloride, and the like.

Preferably, the synthetic organic liner material has a low coefficient of friction in addition to resistance to chemical attack. Certain fluoropolymers, such as polytetrafluoroethylene have such a low coefficient of friction as to be referred to as self-lubricating.

A particularly suitable ball for the valve of this invention may be fabricated from a solid piece of a fluorocarbon polymer.

Changes in details of construction can be effected by those skilled in the art without departing from the spirit and the scope of the invention as defined in and limited solely by the appended claims.

I claim:

1. A lined ball valve comprising a hollow body spool, opposed hollow end casings mounted in sealing relation on the ends of said spool, a valve ball having a fluid passage therein mounted within said body spool in resilient sealing engagement with said end casings, means for rotating said valve ball, said end casings and said spool each being interiorly lined with corrosion resisting material, and said valve ball and said fluid passage being covered and lined with corrosion resisting material, whereby all flow contact areas are protected from corrosive action of fluids passing therethrough.

2. A lined ball valve as claimed in claim 1, wherein the spool liner is lapped back over the ends of said spool, and the end casing liner inner ends are lapped over the spool liner lapped-back portion with the end casing liner outer ends lapped over the outer ends of said end casings, thereby preventing the liners during expansion and contraction thereof from pulling away from the supporting spool and end casings, thus preventing fluid contact with valve elements other than said linings.

3. A lined ball valve as claimed in claim 1, wherein said corrosion resisting materal is a synthetic organic plastic having a low coefficient of friction.

4. A lined ball valve as claimed in claim 3, wherein said synthetic organic plastic is a fluorocarbon polymer.

5. A lined ball valve as claimed in claim 3 wherein said synthetic organic plastic is polytetrafluoroethylene.

6. A lined ball valve as claimed in claim 3, wherein said synthetic organic plastic is polyethylene.

7. A plastic lined ball valve comprising a pair of cylindrical opposed end casings, said casings terminating inwardly in annular body flanges, an annular body spool seal slot in each of the opposed faces of said flanges, resilient sealing means in said seal slots, annular resilient ball sealing means around the radially innermost edge of each of said faces, plastic end casing liners in intimate contact with said end casings, said liners covering said opposed body flange faces including said seal slots and sealing means, a cylindrical body spool axially disposed between said opposed casings, a plastic spool liner in intimate contact with the interior surface of said body spool, the ends of said spool being in sealing engagement with said end casing flange seal slots, means for securing the sealing inter-relation of the end casings and spool, a valve ball disposed within said body spool, said ball engaging in sealing relation said plastic end casing liners in the area of said resilient ball sealing means, said ball being centrally apertured to provide a fluid passage therethrough, the surfaces of said ball comprising plastic material, and means for rotating said ball, a fluid flow through the valve taking place upon alignment of said valve ball fluid passage with said end casings, stoppage of flow being effected by orienting said valve ball so as to position said fluid passage perpendicularly to the cylindrical end casings.

8. A plastic lined ball valve comprising a pair of cylindrical opposed end casings, said casings terminating inwardly in annular body flanges, an annular body spool seal slot in each of the opposed faces of said flanges, an annular ball seal seat in the radially innermost edge of each of said faces, resilient sealing means in said seal slots and said seal seats, plastic end casing liners in intimate contact with said end casings, said liners covering said opposed body flange faces including said seal slots, seal seats and said sealing means, said liners extending axially from said seal slots forming a lip portion, a cylindrical body spool axially disposed between said opposed casings, a plastic spool liner in intimate contact with the interior surface of said body spool, said spool liner being lapped back over the annular edges of said spool, the lapped ends of said spool being in sealing engagement with said end casing flange seal slots, said lapped ends disposed within said casing liner lip portions, means for adjustable securing the sealing inter-relation of the end casings and spool, a valve ball disposed within said body spool, said ball engaging in sealing relation said plastic end casing liners in the area of said ball seal seat resilient sealing means, said ball being centrally apertured to provide a fluid passage therethrough, the surfaces of said ball comprising plastic material, and means for rotating said ball, a fluid flow through the valve taking place upon alignment of said valve ball fluid passage with said end casings, stoppage of flow being effected by orienting said valve ball so as to position said fluid passage perpendicularly to the cylindrical end casings.

9. A plastic lined ball valve as claimed in claim 8 wherein said means for rotating said ball comprises a stem portion extending from said ball into a gland in said body spool, a handle connected to said stem portion, and gland sealing means, whereby actuation of said handle effects a rotation of said valve ball.

10. A plastic lined ball valve as claimed in claim 8 wherein an externally adjustable bottom guide plug is provided to support said ball.

11. A plastic-lined ball valve as claimed in claim 10 wherein a resilient disc is secured to said bottom guide plug to provide a resilient ball support.

12. A plastic lined ball valve as claimed in claim 8, wherein said plastic liners and ball surfaces comprise a fluorocarbon.

13. A plastic lined valve as claimed in claim 12 wherein said plastic liners and ball surfaces comprise polytetrafluoroethylene.

14. A plastic lined ball valve as claimed in claim 8 said resilient sealing means being rubber sealing rings.

15. A plastic lined ball valve as claimed in claim 8 including vent holes in said end casings and body spool.

References Cited in the file of this patent

UNITED STATES PATENTS

| | | |
|---|---|---|
| 2,032,623 | Lewis | Mar. 3, 1936 |
| 3,009,680 | Kaiser | Nov. 21, 1961 |
| 3,024,802 | Stillwagon | Mar. 13, 1962 |
| 3,026,899 | Mischanski | Mar. 27, 1962 |